United States Patent
Chen et al.

(10) Patent No.: US 9,767,064 B2
(45) Date of Patent: *Sep. 19, 2017

(54) LOW POWER UNIVERSAL SERIAL BUS

(71) Applicant: Intel Corporation, Santa Clara, CA (US)

(72) Inventors: Huimin Chen, Portland, OR (US); Kok Hong Chan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 13/729,591

(22) Filed: Dec. 28, 2012

(65) Prior Publication Data

US 2014/0006664 A1    Jan. 2, 2014

Related U.S. Application Data

(63) Continuation of application No. 13/539,370, filed on Jun. 30, 2012, now Pat. No. 9,239,810.

(51) Int. Cl.
*G06F 13/40*    (2006.01)
*G06F 1/32*    (2006.01)

(52) U.S. Cl.
CPC ........ *G06F 13/4072* (2013.01); *G06F 1/3253* (2013.01); *G06F 2213/0042* (2013.01); *Y02B 60/1235* (2013.01)

(58) Field of Classification Search
CPC ..................... G06F 13/4072; G06F 1/3253
See application file for complete search history.

(56) References Cited

U.S. PATENT DOCUMENTS

| | | | | |
|---|---|---|---|---|
| 6,593,768 B1 * | 7/2003 | Iyer | ...................... | G06F 13/4086 326/30 |
| 7,058,120 B1 * | 6/2006 | Lu | ......................... | H03K 5/1565 341/100 |
| 2006/0053244 A1 * | 3/2006 | Fruhauf | .............. | G06F 13/4068 710/313 |
| 2006/0077916 A1 | 4/2006 | Oshita et al. | | |
| 2006/0277339 A1 * | 12/2006 | Sakaki | .................. | G06F 13/385 710/62 |

(Continued)

FOREIGN PATENT DOCUMENTS

TW    200820003 A    5/2008
WO    2014004896 A1    1/2014

OTHER PUBLICATIONS

Interchip USB Supplement to the USB 2.0 Specification, Revision 1.0, Mar. 13, 2006 (48 pages).

(Continued)

*Primary Examiner* — Nimesh G Patel
(74) *Attorney, Agent, or Firm* — International IP Law Group, P.L.L.C.

(57) ABSTRACT

Systems and method for operating a low power universal serial bus are described herein. A universal serial bus port includes a link layer and protocol layer that are compatible with a standard USB2 protocol. The link layer and protocol layer to control a physical layer for transmitting and receiving data on a pair of signal lines. The physical layer includes a fully-digital Low-Speed/Full-Speed (LS/FS) transceiver to transmit and receive data on the pair signal lines using single-ended digital communications on the pair of signal lines.

38 Claims, 11 Drawing Sheets

(56) References Cited

U.S. PATENT DOCUMENTS

| | | | |
|---|---|---|---|
| 2007/0024327 A1* | 2/2007 | Howe | H04L 25/028 327/108 |
| 2008/0140885 A1* | 6/2008 | Collins | G06F 13/4282 710/67 |
| 2008/0320202 A1* | 12/2008 | Monks | G06F 13/426 710/313 |
| 2009/0043925 A1 | 2/2009 | Govindaraman | |
| 2010/0275037 A1* | 10/2010 | Lee | G06F 13/385 713/189 |
| 2010/0287456 A1 | 11/2010 | Chang et al. | |
| 2011/0219163 A1 | 9/2011 | Beadnell et al. | |
| 2012/0137032 A1 | 5/2012 | Bohm | |
| 2014/0006663 A1 | 1/2014 | Chen et al. | |

OTHER PUBLICATIONS

International Search Report and Written Opinion received for PCT Patent Application No. PCT/US2013/048299, dated Oct. 9, 2013, 17 pages.

Universal Serial Bus Peripheral Transceiver with Voltage Regulator, USB1T1105A, 2005, pp. 1-12.

Supplementary European Search Report, EP App. No. 13810629, dated Jan. 13, 2016, 2 pages.

* cited by examiner

600

600

900

1100

LOW POWER UNIVERSAL SERIAL BUS

CROSS-REFERENCE TO RELATED APPLICATION

This application is a continuation of U.S. patent application Ser. No. 13/539,370, filed on Jun. 30, 2012, entitled "A Low Power Universal Serial Bus," the contents of which are hereby incorporated by reference for all purposes.

BACKGROUND

The methods and systems disclosed herein relate to an input/output (IO) signaling protocol. More specifically, a low-voltage, low-power solution for Universal Serial Bus 2.0 (USB2) is disclosed.

USB is an industry protocol designed to standardize the interfaces between computer devices for communication and supplying electrical power. The USB2 protocol has enjoyed widespread adoption in nearly every computing device, and has received tremendous support in terms of technology development with well-established intellectual property (IP) portfolios and standardized software infrastructure.

The standard USB2 specification uses 3.3 Volt analog signaling for communications between the two USB2 ports. The 3.3 Volt signal strength tends to introduce integration challenges because some advanced semiconductor processes are moving towards a very low geometry leading to the gate oxide of a CMOS transistor no longer able to tolerate higher voltages, such as 3.3 Volt. In addition, the standard USB2 specification results in relatively high levels of power consumption at both idle and active states. As a result, USB2 may not be suitable for devices that place stringent specifications on I/O power consumption, such as mobile platforms.

DESCRIPTION OF THE EMBODIMENTS

Figure 1:
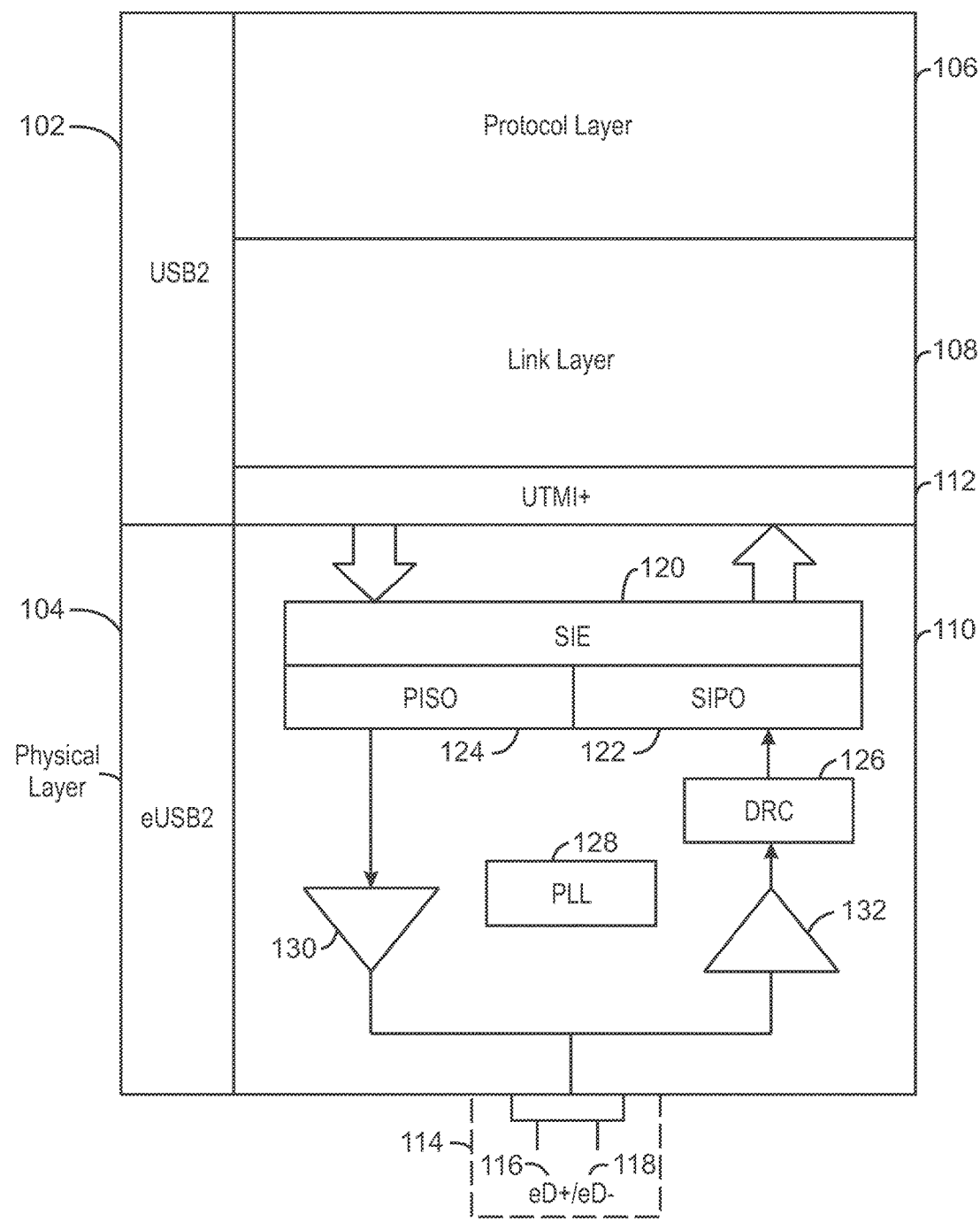
FIG. 1 is a block diagram of a universal serial bus architecture in accordance with embodiments.

Embodiments described herein relate to improved signaling techniques that provide a lower signal voltage and reduced power consumption compared to standard USB2. The improved signaling techniques may be used in a new USB protocol, which may be referred to herein as embedded USB2 (eUSB2). The signaling techniques described herein can be used to support the standard USB2 operation at the protocol level. Furthermore, the signaling techniques described herein may use simplified physical layer architecture as compared to the standard USB2 physical layer architecture. The simplified physical layer architecture disclosed herein can support Low-Speed (LS) operation, Full-Speed (FS) operation, or High-Speed (HS) operation. During High-Speed operation, the link is operated using low-swing differential signaling, for example, 0.2 Volt differential signaling as opposed to 0.4 Volt differential signaling used in standard USB2. During Low-Speed or Full-Speed operation, the simplified PHY architecture enables the use of a fully digital communication scheme. For example, the simplified PHY architecture can use 1 Volt CMOS circuitry, as opposed to the 3.3 Volts CMOS signaling used in standard USB2. In a fully digital communication scheme, the analog components typically used in standard USB2, such as current sources and operational amplifiers are eliminated.

Embodiments can support a native mode and repeater mode. Native mode, as referred to herein, describes operation wherein both the host and device ports implement an eUSB2 PHY and communicate based on eUSB2 signaling. The native mode may be used in cases in which backward compatibility with the standard USB2 is not needed. For example, the native mode may be used for chip to chip communications wherein both chips are soldered to a mother board. The repeater mode allows eUSB2 to support standard USB2 operation with the use of half-duplex repeater device. The repeater mode of operation is described further in relation to co-pending patent application Ser. No. 13/539, 377, filed on Jun. 30, 2012, titled "A Clock-Less Half-Duplex Repeater," which is incorporated by reference herein in its entirety for all purposes.

Embodiments described herein support a new device presence detection scheme that can be used for low-voltage signaling protocols and results in very low power consumption while in idle mode. The standard USB2 specifications utilize device passive pull-up and host passive pull-down to detect device connect and determine mode of operation. Thus, the USB2 link maintains a constant direct current (DC) path, formed by device passive pull-up and host passive pull-down, when the link is idle. Wire voltage is read by the host to determine the connect status of the device. Due to the pull-up and pull-down resistors, the standard USB2 consumes approximately 600 µW of power when the link is in idle mode. The new digital disconnect detection techniques described herein use a device ping to indicate device presence during idle (LPM-L1 or Suspend) rather than device pull-up. By eliminating device pull-up for detecting device presence, the link power consumption while in idle state can be eliminated. For example, the resulting power consumption of the link may be reduced to the power consumption that results from leakage current.

Furthermore, the eUSB2 protocol in accordance with embodiments makes use of 1 Volt signaling for Full-Speed and Low-Speed operations instead of 3.3 Volt. The 1 Volt transistors generally have a higher pin leakage current compared to 3.3 Volts transistors, which have thicker gate oxide. To reduce current flow through the pull-up and pull-down resistors, the resistance of the pull-down resistors and pull-up resistors could be increased. However, increasing the resistance of the pull-down resistors and pull-up resistors could result in the active buffer not being able to override the strengthened pull-ups. The new device detection scheme in accordance with embodiments uses an active buffer driver on the downstream device to actively drive the eD+ or eD− signal lines to indicate device presence, instead of the pull-up resistors. Thus, the use of an active buffer to override the strengthened pull-ups can be eliminated. In some embodiments, the pull-up resistors can be eliminated.

Present USB2 specifications also make use of a sideband wire to detect an On-The-Go (OTG) device, which is routed to an on-chip general purpose input buffer (GIO). In accordance with embodiments, detection of an OTG device can be accomplished through the use of an inband OTG detect mechanism. Thus, the sideband wire used to detect OTG capability can be eliminated, thus reducing GIO pin count.

FIG. 1 is a block diagram of a universal serial bus architecture in accordance with embodiments. The eUSB2 architecture may be used in any suitable electronic device, including desktop computers, laptop computers, tablets, and mobile phones, among others. The eUSB2 architecture 100 may contain a standard USB2 segment 102 and a eUSB2 segment 104 in accordance with embodiments. The standard USB2 segment 102 may include a protocol layer 106 and a link layer 108. The protocol layer 106 is used for managing the transfer of information between a device and a host. For example, the protocol layer 106 is used to determine how to structure information packets. The link layer 108 is used for creating and maintaining a channel of communication (or link) between the device and the host. The link layer 108 also controls the flow of information and power management status of the link. In embodiments, both the protocol layer 106 and the link layer operate in accordance with standard USB2 communication protocols.

The eUSB2 segment 104 contains a physical layer (PHY) 110 unique to the eUSB2 architecture 100. The physical layer 110 can interface with the link layer 108 through any suitable interface 112, such as a USB 2.0 Transceiver Macrocell Interface (UTMI), and UTMI with extensions (UTMI+), among others.

The physical layer 110 may include a pair of eUSB2 data lines 114, referred to herein as eD+ 116 and eD− 118. The data lines are used to transmit signals between an upstream port and a downstream port. Depending on the particular operating mode, the physical layer 110 is configured to transmit data on the data lines 114 using differential signaling, single ended digital communications, or some combination thereof, as explained further below. For example, while operating in high speed, differential signaling may be used to transmit data, while single-ended digital communications may be used to transmit control signals. While operating in low speed or full speed, single-ended digital communications may be used to transmit data and control signals. The functions and behaviors of eD− and eD+ may vary depending on the data rate of the device.

The physical layer 110 may also include a Serial Interface Engine (SIE) 120 for translating USB information packets to be used by the protocol layer 106. The Serial Interface Engine 120 includes a Serial-In, Parallel-Out (SIPO) block 122 for converting incoming serial data received via the signal lines 114 into parallel data for transmitting to the link layer 108. The Serial Interface Engine 120 also includes a Parallel-In, Serial-Out (SIPO) block 122 for converting outgoing parallel data received from the link layer 108 into serial data for transmission onto the signal lines 114. The physical layer 110 can also include a Data Recovery Circuit (DRC) 126 and a Phased Locked Loop (PLL) 128 for recovering data received via the signal lines 114. The physical layer 110 also includes a number of transmitters 130 and receivers 132 for controlling the signals lines 114. For the sake of simplicity, a single transmitter 130 and receiver 132 pair are shown in FIG. 1. However, it will be appreciated that the physical layer 110 can include any suitable number of transmitters 130 and receivers 132 used to implement the various embodiments described herein. The physical layer 100 is described more fully in relation to FIGS. 2 and 3 and the accompanying descriptions.

Figure 2:
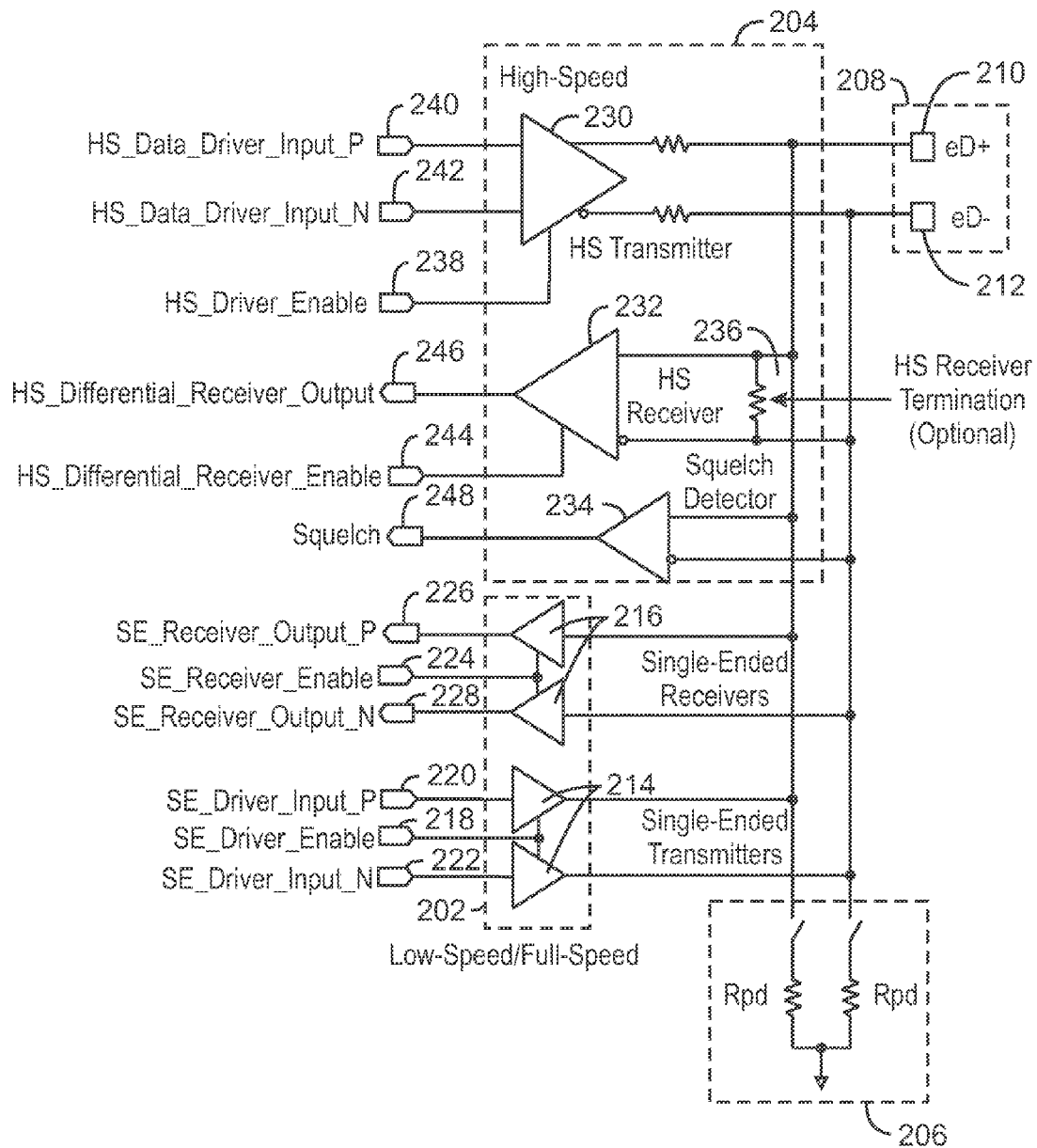
FIG. 2 is a block diagram of a universal serial bus physical layer with High-Speed (HS), Low-Speed (LS), and Full-Speed (FS) capability.

FIG. 2 is a block diagram of a universal serial bus physical layer with High-Speed (HS), Low-Speed (LS), and Full-Speed (FS) capability. In embodiments, the HS, FS, and LS data rates correspond to the data rates specified by the USB2 protocol. For example, during LS operation the PHY may provide a data rate of approximately 1.5 Mbit/s, during FS operation the PHY may provide a data rate of approximately data rate of 12 Mbit/s, and during HS operation, the PHY may provide a data rate of approximately 480 Mbit/s. The eUSB2 PHY 200 can include both a Low-Speed/Full-Speed (LS/FS) transceiver 202 and a High-Speed (HS) transceiver 204. In embodiments, the PHY 200 also includes a pair of pull-down resistors 206 used for device connect detection. The LS/FS transceiver 202 and HS transceiver 204 are communicatively coupled to the eUSB2 signal lines 208, which include eD+ 210 and eD− 212. The HS transceiver 204 and LS/FS transceiver 202 may be configured to selectively take control of the signal lines 208 depending on the data rate capabilities of the upstream device connected to the PHY 200. Techniques for determining the data rate capabilities of the upstream device are described further below.

The LS/FS transceiver 202 may include a pair of single-ended digital transmitters 214 and a pair of single-ended digital receivers 216. These components act as the input and output, respectively, for single-ended signaling. In single-ended signaling, each of the signal lines eD+ 210 and eD− 212 can transmit separate signal information. This is in contrast to standard USB2 implementation, in which LS/FS operations use differential signaling. In differential signaling, information is transmitted through two complementary signals transmitted on the pair of signal lines eD+ 210 and eD− 212. The translation of the physical signals transmitted over the signal lines 208 into binary signal data may be accomplished using any suitable techniques, such as Non-return-to-zero, inverted (NRZI).

The LS/FS transceiver 202 may be fully digital, meaning that the analog components typically present for USB2 LS/FS circuitry, such as operational amplifiers and current sources, are eliminated. The single-ended digital transmitters 214 and the single-ended digital receivers 216 may be digital CMOS (Complementary Metal-Oxide-Semiconductor) components that operate with a signaling voltage of 1.0 Volts, as compared to the standard 3.3 Volt signaling for USB2. Low-speed/Full-speed idle state (SE0) is maintained by the pull-down resistors 206 implemented at the downstream port. To ensure a swift transition to idle state, the port shall drive the bus to SE0 before disabling its transmitters.

The HS transceiver 204 may be an analog transceiver configured for low swing differential signaling. For example, the HS transceiver may operate with a signaling voltage of 0.2 Volts, as compared to the 0.4 Volts used in USB2, thus a reduced power consumption is achieved during data transmission. The HS transceiver 204 can include a High-Speed transmitter 230 for data transmission, a High-Speed receiver 232 for data reception, and a squelch detector 234 for detection of link status, i.e. HS active, and HS idle. Additionally, in some embodiments, the HS transceiver 204 may also include an HS receiver termination 236 to minimize the signal reflection at the receiver leading to improved signal integrity. During the HS operating mode, wherein the HS transceiver 204 is enabled, the PHY 200 communicates data using differential signaling and can also transmit control signals using single-ended communications.

The HS transceiver 204 and LS/FS transceiver 202 are both controlled by the link layer 108, which interfaces with the PHY 200 through the interface 112. Various data and control lines from the interface 112 are coupled to the transceivers 202 and 204. For example, as shown in FIG. 2, enable signals 218, 224, 244, and 238 are used to selectively enable the LS/FS transmitters 214, the LS/FS receivers 216, the HS receiver 232, or the HS transmitter 230, respectively. Complementary driver inputs 240 and 242 are coupled to the HS transmitter 230 for driving the HS transmitter to output data and/or control signals to the signals lines 208. A receiver output 246 is coupled to the HS receiver 232 for receiving data transmitted to the PHY 200 via the signals lines 208. A squelch detector 248, upon detecting the start of HS data packet, disables the SE receiver 216, enables the HS receiver 232, and optionally the receiver termination 236. Positive and negative receiver outputs 226 and 228 are coupled to the LS/FS receivers 216 for receiving data transmitted to the PHY 200 via the signals lines 208. Positive and negative driver inputs 220 and 222 are coupled to the LS/FS transmitters 214 for driving the LS/FS transmitter to output data and/or control signals to the signals lines 208.

In embodiments, the device port (not shown) will have an eUSB interface with a physical layer substantially similar to the physical layer 200. In such an embodiment, the host and device both use the eUSB protocol. In embodiments, the device port may be a standard USB2 port with a standard USB2 physical layer. In such an embodiment, a repeater may be used to translate the eUSB signals sent from the host to standard USB2 signals. For example, the repeater may be configured to translate signals, such as device connect, device disconnect, data rate negotiation, and the like. The repeater may also be used to recondition the voltages of the eUSB signals to the voltages used in standard USB2. The operations of the repeater are described further in relation to co-pending patent application Ser. No. 13/539,377.

Figure 3:
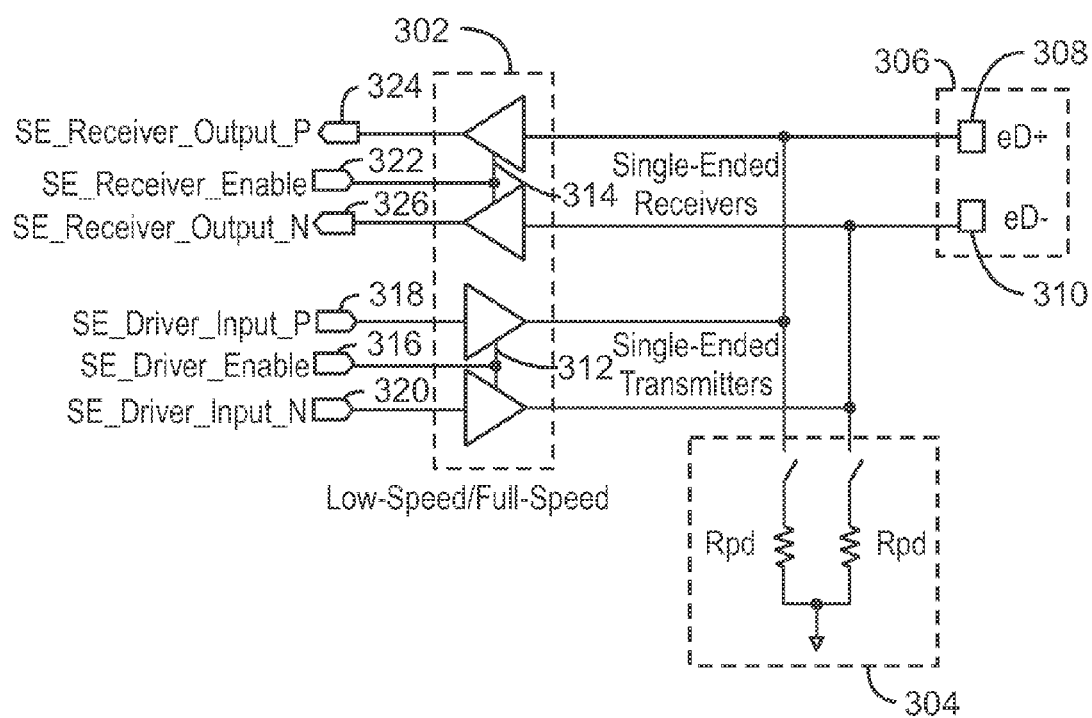
FIG. 3 is a block diagram of the eUSB2 physical layer with Low-Speed or Full-Speed capability.

FIG. 3 is a block diagram of a universal serial bus physical layer with Low-Speed or Full-Speed capability. As shown in FIG. 3, the eUSB2 physical layer 300 can include a fully digital single-ended transceiver 302 without also including a High-Speed analog transceiver. It may function similarly to the eUSB PHY 200 shown in FIG. 2, but does not have the capability to operate at High Speed (HS). The LS/FS PHY 300 may include an SE transceiver 302, a set of pull-down resistors 304, and a pair of eUSB2 data lines 306.

Figure 4:
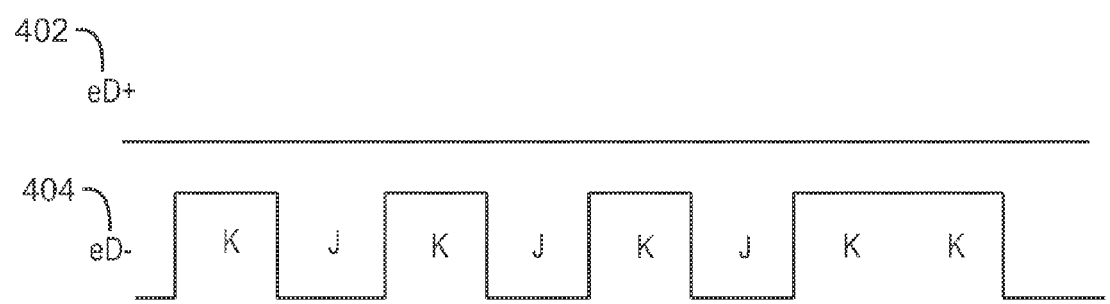
FIG. 4 is a timing diagram of a SYNC pattern used in Low-Speed or Full-Speed mode.

FIG. 4 is a timing diagram of a SYNC pattern used in Low-Speed or Full-Speed mode. The SYNC pattern 400 may be used with the PHY 200 (FIG. 2) and the PHY 300 (FIG. 3) to mark the beginning of a packet sent from one port to another. As shown in FIG. 4, the SYNC pattern may use single ended communication, which is suitable for digital CMOS operation. In accordance with embodiments, eUSB2 drives the SYNC pattern on eD− 404 while maintaining logic '0' on eD+ 402 through the pull down resistors 206. As shown in FIG. 4, SYNC is indicated when the data line eD+ 402 is pulled down to logic '0' and during that time the data line eD− 404 transmits a pattern of KJKJKJKK.

In High-Speed, the SYNC pattern (not shown) is similar to that of standard USB2, with the voltage swing redefined. In High-Speed, neither data line eD+ 402 or eD− 404 is held at logic '0' as High-Speed utilizes differential signaling. Instead, both data lines may toggle the SYNC pattern, for example, the series KJKJKJKK.

Figure 5:
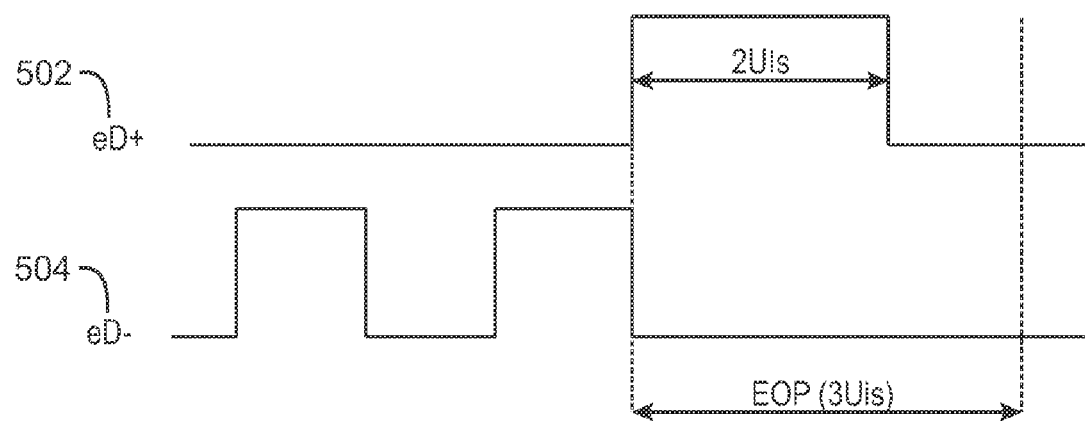
FIG. 5 is a timing diagram of an End-of-Packet (EOP) pattern in Low-Speed or Full-Speed mode.

FIG. 5 is a timing diagram of an End-of-Packet (EOP) pattern in Low-Speed or Full-Speed mode. The EOP pattern 500 is used to signify the end of the data packet sent from one port to another. In accordance with embodiments, the EOP pattern 500 is indicated by 2 UIs of logic '1' at eD+ and one UI of SE0, while eD− maintains logic '0' through the pull-down resistors 304. Single-ended 0 (SE0) describes a signal state in which both eD− and eD+ are at logic '0'. Sending EOP on eD+, accompanied with SYNC and packet data being transmitted at eD−, allows a three-state (J, K, SE0) representation of a standard USB2 packet possible. The EOP pattern in accordance with embodiments described herein contrasts with standard USB2, in which the EOP pattern would be indicated by 2 UIs of SE0 followed by 1 UI of J.

The High-Speed eUSB2 EOP pattern (not shown) is similar to that of standard USB2 except that the voltage swing is redefined. High-Speed EOP is indicated by 8 UIs of consecutive J or K. SOF EOP is indicated by 40 UIs of consecutive J or K.

Figure 6A:
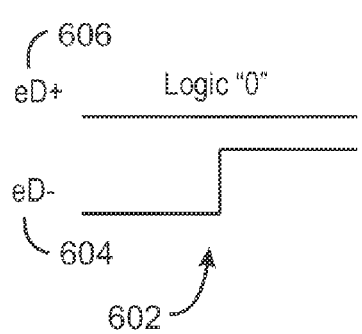
FIGS. 6A and 6B are timing diagrams showing an example of eUSB2 signal timing.
Figure 6B:
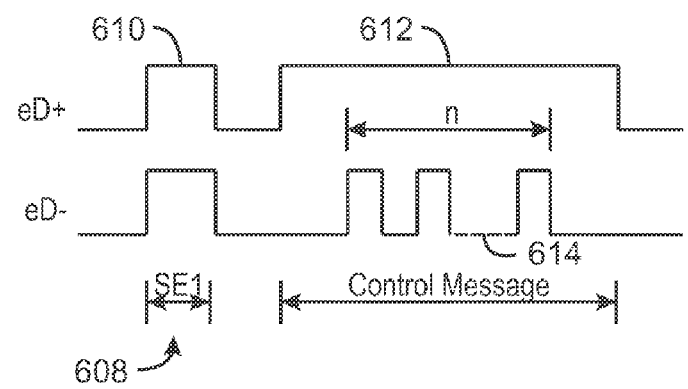

FIGS. 6A and 6B are timing diagrams showing an example of eUSB2 signal timing. In embodiments, single-ended signaling is used for LS/FS packet transmission in L0 mode. The term L0 describes a mode of operation in which a connection between the host and the device is active, enabling the host to communicate with the device. Single-ended signaling may also be used for interactions between two ports in different link states (not including L0), and for a host to issue control messages at any link state.

When an LS/FS packet is transmitted, the SYNC pattern 400 and packet data is transmitted at eD− 604 while eD+ is held at logic '0', and SE0 of the EOP pattern 500 is transmitted at eD+ while eD− is held at logic '0'. When host initiates a control message, the control message may begin with SE1. Single-ended 1 (SE1) describes a signal in which both eD− and eD+ are at logic '1'. The difference in signal timing and format at the beginning between the transmission of data packets versus the transmission of control messages allows a device in L0 to distinguish whether a received packet is a data packet or a control message before proceeding to process the packet. In embodiments, the downstream port interprets the signaling from an upstream port based on its previous state of packet transaction or link state.

FIG. 6A is a timing diagram of a LS/FS Start of Packet (SOP) pattern 602 sent from an upstream port (Host) to a downstream port (Device). As shown in FIG. 6A, the SOP pattern 602 is indicated by using eD− 604 to transmit SYNC pattern and packet data, while eD+ 606 remains at logic '0'. When all of the packets have been transmitted, eD+ 606 may be used to transmit EOP while eD− 604 remains at logic '0'.

FIG. 6B is a timing diagram of a control message pattern 608 sent from an upstream port (Host) to a downstream port (Device). As shown in FIG. 6B, the start of control message (SOC) pattern 608 is indicated when a downstream port drives an SE1 pulse 610 for a definite period of time as a signature for the SOC message. Following the SE1 pulse 610, a control message can be encoded within an active window 612 using a series of pulses. During this active window 612, eD+ 606 may be driven at logic '1' while a number of pulses 614 may be activated on eD− 604. The number of pulses 614 may determine the nature of the control message. Control message signaling is described further in co-pending patent application Ser. No. 13/539,375, filed on Jun. 30, 2012, titled "Explicit Control Message Signaling," which is incorporated by reference herein in its entirety for all purposes.

In embodiments, single ended signaling is also used for host and device interactions during power-up, Reset, Suspend, and L1. Suspend, as used herein, describes a control message sent to the device from the host to temporarily disable link activity in order to limit power consumption. While in Suspend, the device may still accept a Resume control message or a Reset control message from the host. L1, as used herein, describes a mode that may perform similarly to Suspend in some eUSB2 and USB2 embodiments. Resume, as used herein, describes a control message from the host that signals the device to re-enter L0 mode from Suspend or L1. Reset, as used herein, describes a control message sent from the host to set the device in a default unconfigured state.

Figure 7:
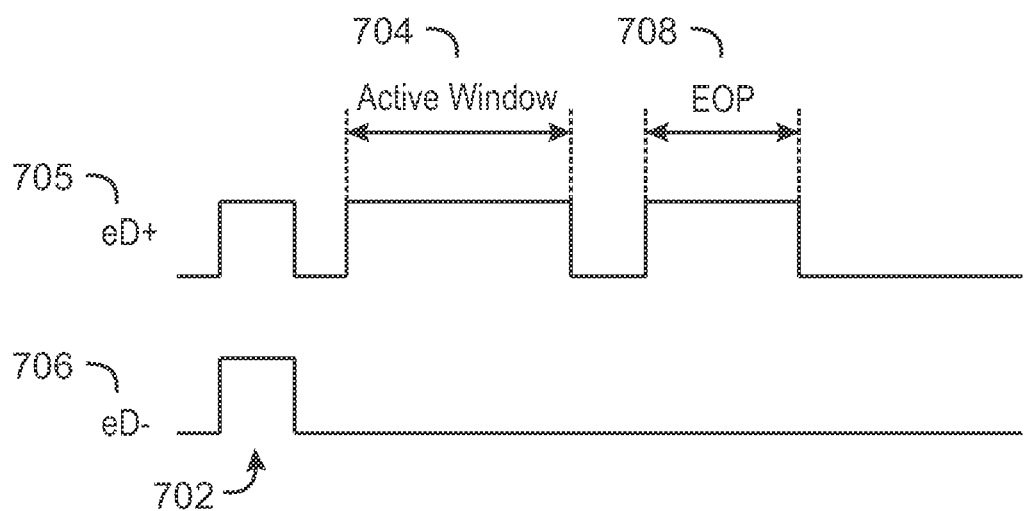
FIG. 7 is a timing diagram of a Low-Speed Keep Alive signal.

FIG. 7 is a timing diagram of a Low-Speed Keep Alive signal. LS Keep Alive 700 is a control message sent periodically during L0 to prevent a Low-Speed peripheral device from entering Suspend. As seen in FIG. 7, the Keep Alive signal 700 may include an SE1 pulse 702, an active window 704 on eD+ 705 with no pulses on eD− 706, and an EOP signal 708.

Device Disconnect Mechanism

As explained above, standard USB2 uses a device pull-up and host pull-down mechanism to detect device connect or device disconnect when operating at LS/FS, or in L1 or Suspend. The wire voltage from the voltage divider network formed by the pull-up resistors and pull-down resistors 206 are read by the host to determine device connect status. This results in constant DC power being wasted in LS/FS or in L1, or in Suspend.

The invention eliminates the idle power by having the link in single-ended 0 (SE0) during the idle state, in which case both of the data wires, eD+ and eD−, are held to ground by the downstream port. Accordingly, little or no idle power is consumed during the idle state. During the standard USB2 idle state, referred to as "idle J", both the pull-up and pull down are enabled, resulting is wasted power. In embodiments, the pull-up from the device may be eliminated. Upon resuming from Suspend, the host requests the device to transmit a device ping to re-affirm connectivity. A Disconnect event will be detected if the host does not receive the digital ping signal from the device.

Figure 8:
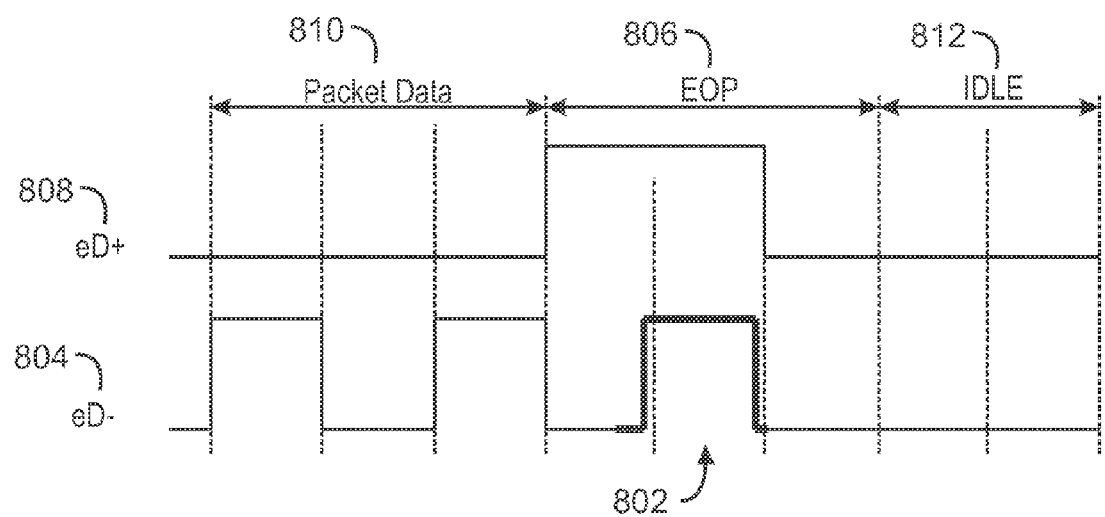
FIG. 8 is a timing diagram of a device disconnect detection technique for Full-Speed or Low-Speed operation during L0.

FIG. 8 is a timing diagram of a device disconnect detection technique for Full-Speed or Low-Speed operation during L0. As shown in FIG. 8, a digital ping mechanism 800 may be used to accomplish device disconnect detect during L0 at LS/FS operation. The device ping 802 may be defined as a 1-UI logic '1' at eD− in FS or LS mode. As shown in FIG. 8, after detecting an EOP signal 806 on eD+ following a packet, the upstream port may transmit the device ping 802 on eD− 804 within a specified time limit (for example, 3 UIs) upon detecting the start of the EOP signal 802. Depending on the phase and frequency offset between the remote bit clock and local bit clock, the device ping 802 may be actually transmitted as early as 1 UI and as late as more than 2 UIs. After sending the digital ping 802 back to the host, the device may enter Idle mode 812. To confirm connectivity, the upstream port may transmit the device ping 802 periodically on every frame period. Transmitting the device ping 802 in a periodic fashion allows the host to be aware of the device presence even when there is no data traffic between the host and device, thus prevents the device from being disconnected. The downstream port may declare device disconnect during L0 if it has not received any packet, and has not received any device ping for three consecutive frame periods.

In embodiments, the downstream (host) port performs disconnect detect during resume from L1 or Suspend. In response, the upstream (device) port sends the digital ping signal upon resume to declare connected state during L1 or Suspend. For a device sending a digital ping to declare connect while in L1 or suspend, the device drives eD+ to send the digital ping. For a device sending a digital ping to declare connect while in L1 or Suspend, the device drives eD− to send the digital ping.

Figure 9:
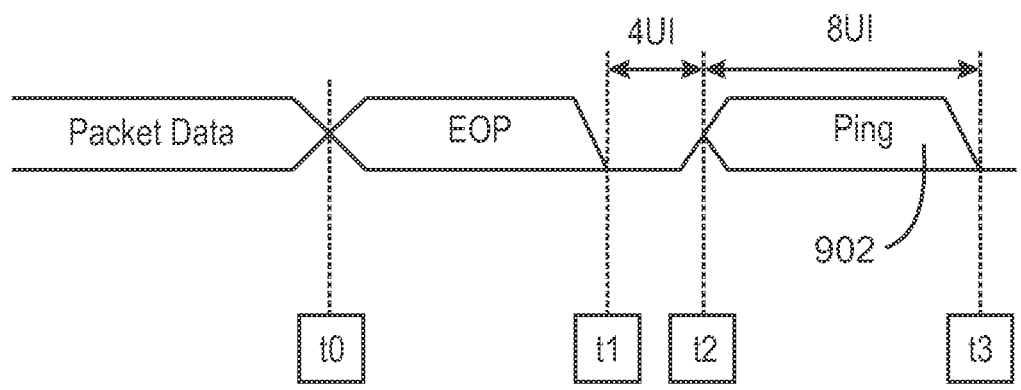
FIG. 9 is a timing diagram of a device disconnect detection technique for High-Speed mode during L0 state.

FIG. 9 is a timing diagram of a device disconnect detection technique for High-Speed mode during L0 state. Standard USB2 HS uses analog approach to detect device disconnect. Specifically, standard USB2 uses envelope detection during EOP (End of Packet) of SOF (start of frame) for disconnect detection. The use of envelope detection requires an analog comparator and an accurate reference voltage. To facilitate this type of disconnect detection, the EOP of SOF is extended to 40 UIs such that the envelope detector has enough time to detect the disconnect event if the device is disconnected. In embodiments, eUSB uses an analog ping mechanism 900 to accomplish device disconnect detect during L0 at High speed. The device ping 902 may be transmitted periodically by the device during L0 idle to announce its presence and prevent being disconnected. By using a digital ping mechanism rather than envelope detection, various analog components, such as the envelope detector, can be removed, resulting in a simplified physical layer architecture. The mechanism for disconnect detection in L1 or Suspend for a High-Speed device may be the same as Full-Speed.

As shown in FIG. 9, a packet of data 904 finishes transmitting at t0, and is succeeded by an EOP signal 906. At t1, the EOP signal 906 has finished. At t2, if no other activity has occurred, the device may send the device ping 902 to announce its presence to the downstream (host) port. The device ping 902 may contain 8 UIs of consecutive J or K. At t3, the device ping 902 has finished transmitting. The upstream port, while in L0, may transmit at least one device ping 902 at specified time intervals (for example, every microframe period of 125 μs) if the upstream port's transmitter is in L0 idle. The downstream port may declare disconnect of the device if it has not received any packets or pings from the device for three consecutive microframe periods.

In native mode, the upstream device may not be required to report device disconnect during the L1 or Suspend. This allows the device to completely power down the transmitter during this power management state and maximize power saving. Upon Resume, the upstream port may send a digital ping and the downstream port may perform disconnect detection routines.

When operating in repeater mode, device disconnect is detected by the repeater and reported to the Host. Device disconnect may be reported in Suspend or L1 when operating in repeater mode. When the repeater detects a disconnect event of a standard USB2 device, the repeater will convey the message to the host eUSB2 port through Single-ended Disconnect Signaling (SE-DISC), wherein both of the signal lines, eD+ and eD− are both driven to logic '1' for a specified amount of time. Once the host observes SEDISC, the link state machine will transition to the Connect link state from the Suspend/L1 link state. The disconnect process used during repeater mode is described further in relation to co-pending patent application Ser. No. 13/539,377.

It is to be understood that implementation of the device disconnect detection techniques described herein are not restricted to only eUSB2 implementations. In embodiments, the disconnect detection techniques described above can be applied to any Input/Output (I/O) standard used in advanced deep submicron process or any IO standard that supports multiple data rate and modes of operation.

Device Connect and Mode of Operation Detection

Device connect detection enables the host port to determine when a device has been coupled to the host port. The detection of a device connect also involves a process that enables the host and device to declare their data rate capabilities to one another, for example, whether the host and/or device have LS capability, FS capability, and/or HS capability.

As explained above, standard USB2, which uses 3.3V signaling, utilizes device passive pull-up and host passive pull-down to detect device connect. The host port may have 15 kΩ pull-down enabled by default. When no device is connected, both data wires D+ and D− are pulled low. When connected, a device will have a 1.5 kΩ pull-up on either wire, depending on the device's data rate. The host can determine the device's data rate by judging which wire is pulled high. Additionally, standard USB2 specifications indicate the ability to detect On-The-Go (OTG) devices through a sideband wire called an ID pin, which is connected to an on-chip GIO. For operations that use lower signaling voltages, the standard connect detection scheme may not be feasible, as the resistance of the pull-down resistors and pull-up resistors would have to be significantly strengthened such that an active buffer may not be able to override the pull-up resistors.

In embodiments, the eUSB2 connect event is generated by using the LS/FS transmitters 214 (FIG. 2) of the device port to drive the signal lines, either eD+ 210 or eD− 212, to logic '1'. Furthermore, during connect and connect detection, eD+ 210 and eD− 212 form a dual-simplex link to allow a Host and a device to interact with each other without causing contention. For example, if a FS or HS device is connected, eD+ will be driven to logic '1' by the FS transmitter at the device side, while eD− remains pull-down to logic '0', and the FS receiver at the device side is enabled to detect any state change at eD− driven by the FS transmitter at Host side. In embodiments, the passive pull-up resistors on the device port may be eliminated. Additionally, the device detection scheme 1000 may include an inband mechanism to detect OTG capability without using a sideband wire, thus reducing GIO pin count.

Figure 10:
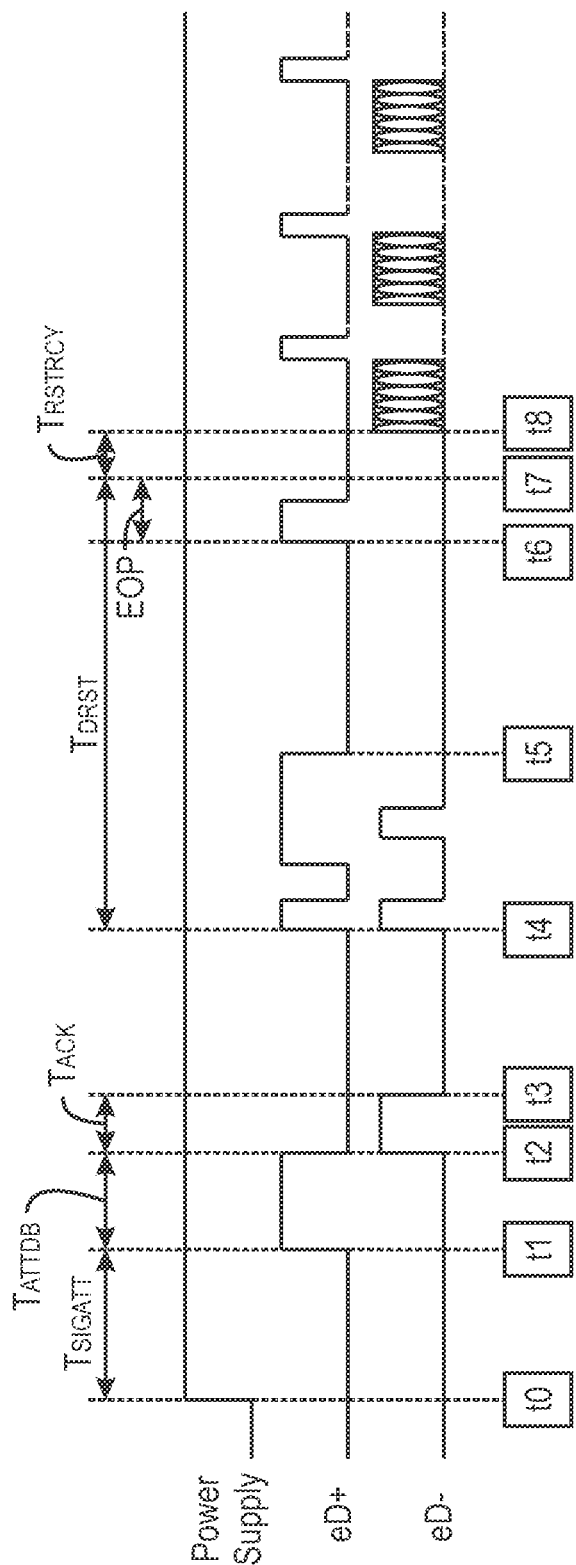
FIG. 10 a timing diagram showing an example of a device connect detection technique.

FIG. 10 a timing diagram showing an example of a device connect detection technique. In the example shown in FIG. 10, interactions occur between a downstream port and an upstream port in native mode at Full-Speed. Other embodiments considered by this process may include Low-Speed data rates or interactions between a downstream port on peripheral repeater mode and an upstream port on a Dual Role Device.

At t0, or power-up, the ports may enable their pull-down resistors. The downstream port may disable its transmitters and enable its receivers at both eD+ and eD−.

At t1, the upstream port may drive eD+ or eD− to logic '1', depending on the speed to be declared by the upstream port. For example, as shown in FIG. 10, if a device is Full-Speed or High-Speed capable, it may only drive logic '1' at eD+ and enable its receiver at eD−, which is not driven by the upstream port. If the upstream port has only Low-speed capabilities, it may drive logic '1' at eD− and enable its receiver at eD+, which is not driven by the upstream port.

At t2, the downstream port may declare device connect and acknowledge the device. The acknowledgement process may vary depending on the declared capabilities of the upstream device at time t1. For example, if the downstream port has detected logic '1' at eD+ and logic '0' at eD− for the duration of $T_{ATTDB}$, as shown in FIG. 10, the downstream port drives logic '1' at eD− for $T_{ACK}$. If it has detected logic '0' at eD+ and logic '1' at eD− for the duration of $T_{ATTDB}$, it drives logic '1' for eD+ for $T_{ACK}$ and declares Low-Speed device connect. In other words, the in-band hand shaking mechanism is configured as a dual-simplex link to ensure that the acknowledgement is driven on the signal line opposite the signal line that was used by the upstream device to declare its presence. In the scenario shown in FIG. 10, the downstream port is receiving a device presence signal on eD+. Thus, the handshake signal transverses through D−. In this way, the link partners do not drive the signal wires simultaneously, thus avoiding wire contention. In standard USB2, the active driver of a host is expected to override the wire state which is held at weak high by a passive pull-up at the upstream device.

Also at t2, the upstream port may respond upon receiving acknowledgement from the downstream port. If the upstream port is Full-Speed or High-Speed, it may drive logic '0' at eD+ upon detecting Host acknowledgement at eD−, disable its transmitter, and also enable its receiver at eD+, thus concluding connect.

In the case where a Host function is connected by the repeater in the repeater mode, eD+ may be continuously driven to logic '1' until the repeater has detected logic '0' at eD−, which is when a dual-role host port has detected a host function connected to its micro-AB receptor. If the downstream port has detected logic '1' at eD+ and logic '0' at eD− for the duration of $T_{ATTDB}$, the downstream port may start acknowledgement by driving logic '1' at eD− as shown in FIG. 10 at t2. During the time period indicated by, $T_{ACK}$, the downstream port may continue monitoring eD+. If at the end of acknowledgement at t3, eD+ remains logic '1', the downstream port may declare a host function is connected. If the downstream port has detected eD+ transitioned to logic '0' before t3, it may declare a FS or HS device connected.

At t4, the downstream port may issue a Reset message. The upstream port may reset its control message decoder upon detection of SE1.

At t5, the downstream port may continue Reset by maintaining SE0 based on pull-down resistors. The upstream port may complete Reset decoding and enter Reset.

At t6, the downstream port may drive an EOP to conclude Reset if the device is Low-Speed or Full-Speed. If the device is Low-speed or Full-speed only, the device monitors Reset until its completion. At t7, the downstream port may conclude Reset by driving SE0 and enter Reset recovery. At t8, the ports are ready for initialization.

Returning to t6, if the device has declared Full-Speed capability, speed negotiation commences at t6 to determine whether the device is High-Speed capable. High-Speed negotiation is described below in relation to FIG. 11.

Figure 11:
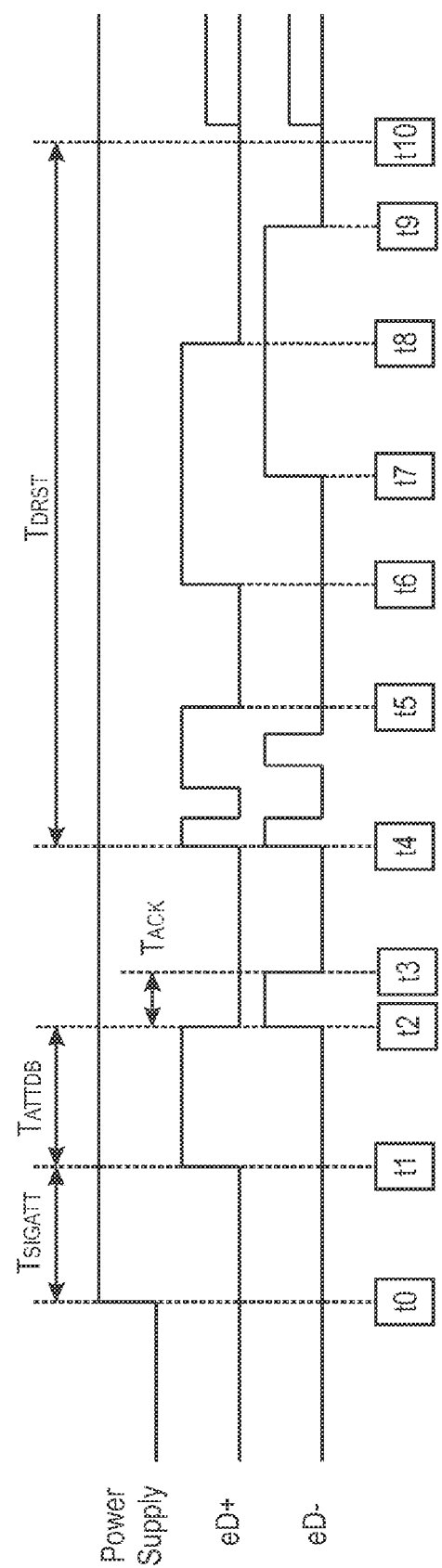
FIG. 11 is a timing diagram showing an example of a device connect detection scheme in which the device declares High-Speed capability.

FIG. 11 is a timing diagram showing an example of a device connect detection scheme in which the device declares High-Speed capability. The speed negotiation is accomplished with single-ended signaling from when the device starts indicating High-speed capable, to when the downstream port acknowledges, and to device when its receiver termination is turned on and ready for High-speed operation. Up to t6 of FIG. 11, the device connect detection operations are the same as in Low-speed/Full-speed, which is described in relation to FIG. 10.

If the device is High-speed, the following operation takes place. At t6, after an upstream port detects Reset, the device drives logic '1' at eD+ to represent device Chirp, if it is High-speed capable. The optional receiver termination 236 (FIG. 2) at both the downstream and upstream ports are disabled until t9.

At t7, after the downstream port detects device Chirp, the downstream port starts driving logic '1' at eD− to represent host Chirp and prepares the downstream PHY 200 for High-speed operation.

At t8, the upstream port shall have its High-speed PHY 200 ready for operation after detecting host chirp. To prepare the upstream port for High-Speed operation, the upstream port drives eD+ to logic '0', disable its single-ended transmitter at eD+ after TSE0_DR, and enable its single-ended receiver at eD+.

At t9, the downstream port drives logic '0' at eD− to signal the completion of speed detection, and the PHY is ready for High-speed operation. Also at t9, the upstream port enters L0 by enabling its optional receiver termination and squelch detector.

At t10, the downstream port concludes Reset. At this time, the link is in L0 state.

It is to be understood that implementation of the device connect and mode of operation detection techniques described herein are not restricted to only eUSB2 implementations. In embodiments, the disconnect detection techniques described above can be applied to any Input/Output (I/O) standard used in advanced deep submicron process or any IO standard that supports multiple data rate and modes of operation.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A universal serial bus apparatus, comprising:
a physical layer, comprising;
a first signal line eD+;
a second signal line eD−;
a single-ended driver enable SE_Driver_Enable;
a single-ended receiver enable SE_Receiver_Enable;
a first Low-speed/Full-speed transmitter having a single-ended driver input SE_Driver_Input_P, an input coupled to the single-ended driver enable SE_Driver_Enable, and an output coupled to the first signal line eD+;
a second Low-speed/Full-speed transmitter having a single-ended driver input SE_Driver_Input_N, an input coupled to the single-ended driver enable SE_Driver_Enable, and an output to be coupled to the second signal line eD−;
a first Low-speed/Full-speed receiver having an input coupled to the first signal line eD+, an input coupled to the single-ended receiver enable SE_Receiver_Enable, and an output coupled to a single-ended receiver output SE_Receiver_Output_P;
a second Low-speed/Full-speed receiver having an input coupled to the second signal line eD−, an input coupled to the single-ended receiver enable SE_Receiver_Enable, and an output coupled to a single-ended receiver output SE_Receiver_Output_N;
a first pull-down resistor Rpd having a first terminal coupled to the first signal line eD+ and a second terminal; and
a second pull-down resistor Rpd having a first terminal coupled to the second signal line eD− and a second terminal coupled to the second terminal of the first pull-down resistor.

2. The universal serial bus apparatus of claim 1, wherein the first Low-speed/Full-speed transmitter, the second Low-speed/Full-speed transmitter, the first Low-speed/Full-speed receiver, and the second Low-speed/Full-speed receiver comprise single-ended digital CMOS components configured for 1 volt signaling.

3. The universal serial bus apparatus of claim 1, wherein the first Low-speed/Full-speed transmitter, the second Low-speed/Full-speed transmitter, the first Low-speed/Full-speed receiver, and the second Low-speed/Full-speed receiver are to use 1 volt signaling.

4. The universal serial bus apparatus of claim 1, (New) The universal serial bus apparatus of claim 1, wherein the first Low-speed/Full-speed transmitter, the second Low-speed/Full-speed transmitter, the first Low-speed/Full-speed receiver, and the second Low-speed/Full-speed receiver are to use 1 volt CMOS circuitry.

5. The universal serial bus apparatus of claim 1, wherein the first Low-speed/Full-speed transmitter, the second Low-speed/Full-speed transmitter, the first Low-speed/Full-speed receiver, and the second Low-speed/Full-speed receiver comprise digital CMOS components.

6. The universal serial bus apparatus of claim 1, the physical layer further comprising a high speed transceiver to transmit data to and to receive data from the first signal line eD+ and the second signal line eD− using differential signaling.

7. The universal serial bus apparatus of claim 6, wherein the high speed transceiver includes a High-speed transmitter and a High-speed receiver.

8. The universal serial bus apparatus of claim 6, wherein the high speed transceiver is to use 0.2 volt differential signaling.

9. The universal serial bus apparatus of claim 6, wherein the high speed transceiver is an analog transceiver for low swing differential signaling.

10. The universal serial bus apparatus of claim 6, wherein the high speed transceiver includes a squelch detector.

11. The universal serial bus apparatus of claim 6, the high speed transceiver including a transmitter to implement source termination.

12. The universal serial bus apparatus of claim 6, the high speed transceiver including a receiver to implement receiver termination.

13. The universal serial bus apparatus of claim 1, wherein the physical layer is configured to use single-ended communications while operating in a Low-speed/Full-speed mode and is configured to use differential signaling while operating in a high speed mode.

14. The universal serial bus apparatus of claim 6, wherein the physical layer is configured to use single-ended communications while operating in a Low-speed/Full-speed mode and is configured to use differential signaling while operating in a high speed mode.

15. The universal serial bus apparatus of claim 1, further comprising a repeater to convert received signals on signal line eD+ and on signal line eD− into USB2 compatible signals.

16. The universal serial bus apparatus of claim 1, wherein the universal serial bus apparatus is to receive a digital ping that indicates a device presence.

17. The universal serial bus apparatus of claim 1, wherein the universal serial bus apparatus is to detect device disconnect if it does not receive a digital ping from an other device within a specific time period.

18. The universal serial bus apparatus of claim 1, wherein the first pull-down resistor Rpd and the second pull-down resistor Rpd are to hold a bus to ground during power-up or when a link is idle.

19. The universal serial bus apparatus of claim 1, further comprising a link layer and a protocol layer.

20. A universal serial bus apparatus, comprising:
a physical layer, comprising;
a pair of Low-speed/Full-speed transmitters to be coupled to a pair of signal lines and to transmit data to the pair of signal lines using single-ended digital communication; and
a pair of Low-speed/Full-speed receivers to be coupled to the pair of signal lines and to receive data from the pair of signal lines using single-ended digital communication
a pair of pull-down resistors selectively coupled to the pair of signal lines, the pair of pull-down resistors to couple both of the pair of signal lines to ground during an idle state.

21. The universal serial bus apparatus of claim 20, wherein the pair of Low-speed/Full-speed transmitters and the pair of Low-speed/Full-speed receivers comprise single-ended digital CMOS components configured for 1 volt signaling.

22. The universal serial bus apparatus of claim 20, wherein the pair of Low-speed/Full-speed transmitters and the pair of Low-speed/Full-speed receivers are to use 1 volt signaling.

23. The universal serial bus apparatus of claim 20, wherein the pair of Low-speed/Full-speed transmitters and the pair of Low-speed/Full-speed receivers are to use 1 volt CMOS circuitry.

24. The universal serial bus apparatus of claim 20, wherein the pair of Low-speed/Full-speed transmitters and the pair of Low-speed/Full-speed receivers comprise digital CMOS components.

25. The universal serial bus apparatus of claim 20, the physical layer further comprising a high speed transceiver to transmit data to and to receive data from the pair of signal lines using differential signaling.

26. The universal serial bus apparatus of claim 25, wherein the high speed transceiver includes a High-speed transmitter and a High-speed receiver.

27. The universal serial bus apparatus of claim 25, wherein the high speed transceiver is to use 0.2 volt differential signaling.

28. The universal serial bus apparatus of claim 25, wherein the high speed transceiver is an analog transceiver for low swing differential signaling.

29. The universal serial bus apparatus of claim 25, wherein the high speed transceiver includes a squelch detector.

30. The universal serial bus apparatus of claim 25, the high speed transceiver including a transmitter to implement source termination.

31. The universal serial bus apparatus of claim 25, the high speed transceiver including a receiver to implement receiver termination.

32. The universal serial bus apparatus of claim 20, wherein the physical layer is configured to use single-ended communications while operating in a Low-speed/Full-speed mode and is configured to use differential signaling while operating in a high speed mode.

33. The universal serial bus apparatus of claim 25, wherein the physical layer is configured to use single-ended communications while operating in a Low-speed/Full-speed mode and is configured to use differential signaling while operating in a high speed mode.

34. The universal serial bus apparatus of claim 20, further comprising a repeater to convert received signals into USB2 compatible signals.

35. The universal serial bus apparatus of claim 20, wherein the universal serial bus apparatus is to receive a digital ping that indicates a device presence.

36. The universal serial bus apparatus of claim 20, wherein the universal serial bus apparatus is to detect device disconnect if it does not receive a digital ping from an other device within a specific time period.

37. The universal serial bus apparatus of claim 20, further comprising two pull-down resistors to hold a bus to ground during power-up or when a link is idle.

38. The universal serial bus apparatus of claim 20, further comprising a link layer and a protocol layer.

\* \* \* \* \*